US007584324B2

(12) United States Patent
Zimmerman et al.

(10) Patent No.: US 7,584,324 B2
(45) Date of Patent: Sep. 1, 2009

(54) STATISTICAL BASED ADMISSION CONTROL TECHNIQUE USING THREE RANDOM VARIABLE ADMISSION CONTROL

(75) Inventors: Roger Zimmerman, West Covina, CA (US); Kun Fu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 468 days.

(21) Appl. No.: 11/203,567

(22) Filed: Aug. 12, 2005

(65) Prior Publication Data

US 2006/0062555 A1 Mar. 23, 2006

Related U.S. Application Data

(60) Provisional application No. 60/601,391, filed on Aug. 12, 2004.

(51) Int. Cl.
G06F 12/00 (2006.01)
G06F 13/00 (2006.01)
G06F 13/28 (2006.01)
G06F 15/16 (2006.01)
G06F 15/173 (2006.01)
H04N 7/173 (2006.01)
H04N 7/16 (2006.01)

(52) U.S. Cl. .................. 711/112; 709/217; 709/225; 709/226; 709/219; 709/231; 709/235; 711/170; 711/171; 711/172; 711/163; 725/87; 725/89; 725/142; 725/92; 725/134

(58) Field of Classification Search ...................... None
See application file for complete search history.

(56) References Cited

U.S. PATENT DOCUMENTS

| | | | | |
|---|---|---|---|---|
| 5,550,998 | A * | 8/1996 | Willis et al. | 711/114 |
| 5,926,649 | A * | 7/1999 | Ma et al. | 710/6 |
| 6,023,720 | A * | 2/2000 | Aref et al. | 718/103 |
| 6,628,612 | B1 * | 9/2003 | Sabry et al. | 370/230 |
| 2005/0283818 | A1 * | 12/2005 | Zimmermann et al. | 725/134 |

OTHER PUBLICATIONS

Bao, Y., et al., "Performance-driven Adaptive Admission Control for Multimedia Applications," *IEEE International Conference on Communications (ICC'99)*, vol. 1, pp. 199-203, 1999.
Berson, S., et al., "Staggered Striping in Multimedia Information Systems," *Proceedings of the 1994 ACM SIGMOD International Conference on Management of Data*, p. 79-90, May 1994.

(Continued)

*Primary Examiner*—Tuan V Thai
*Assistant Examiner*—Marwan Ayash
(74) *Attorney, Agent, or Firm*—Fish & Richardson P.C.

(57) ABSTRACT

Admission of a new disk stream is based on the probability of overcommitting disk bandwidth based on parameters related to the disk. These fixed parameters are determined either by retrieval from the disk or by investigating the disk. Probability functions of the disk parameters may be obtained. Exemplary disk parameters may be average disk seek time, probabilistic determination of the amount of data exchange during a single exchange, and probabilistic information about reading versus writing.

16 Claims, 3 Drawing Sheets

OTHER PUBLICATIONS

Chang, E., et al., "Variable Bit Rate MPEG Video Storage on Parallel Disk Arrays," *First International Workshop on Community Networking*, pp. 127-137, Jul. 1994.

Cheng, S-T., et al., "Dynamic quota-based admission control with sub-rating in multimedia servers," *Multimedia Systems*, 8(2):83-91, Mar. 2000.

Friedrich, M., et al., "Stochastic Resource Prediction and Admission for Interactive Sessions on Multimedia Servers," *Proceedings of the 8th ACM International Conference on Multimedia*, pp. 117-126, Oct. 2000.

Kang, S., et al., "Statistical Admission Control for Soft Real-Time VOD Servers," *Proceedings of the 2000 ACM Symposium on Applied Computing*, pp. 579-584, Mar. 2000.

Kim, I-H., et al., "Measurement-Based Adaptive Statistical Admission Control Scheme for Video-on-Demand Servers," *Proceedings of the 15th International Conference on Information Networking*, p. 471-478, Jan. 2001.

Kim, S-E., et al., "A Reliable Statistical Admission Control Strategy for Interactive Video-On-Demand Servers with Interval Caching," *Proceedings of the 2000 International Conference on Parallel Processing*, p. 135-142, Aug. 2000.

Lee, K., et al., "An effective admission control mechanism for variable-bit-rate video streams," *Multimedia Systems*, 7(4):305-311, Jul. 1999.

Makaroff, D., et al., "An Evaluation of VBR Disk Admission Algorithms for Continuous Media File Servers," *Proceedings of the 5th ACM International Conference on Multimedia*, pp. 143-154, Nov. 1997.

Muntz, R., et al., "RIO: A Real-Time Multimedia Object Server," *ACM SIGMETRICS Performance Evaluation Review*, 25(2):29-35, Sep. 1997.

Nerjes, G., et al., "Stochastic Service Guarantees for Continuous Data on Multi-Zone Disks," *Proceedings of the 16th ACM SIGACT-SIGMOD-SIGART Symposium on Principles of Database Systems*, pp. 154-160, May 1997.

Paulson, L., "The Ins and Outs of New Local I/O Trends," *Computer*, 36(7):13-16, Jul. 2003.

Reddy, A.L.N., et al., "I/O issues in a Multimedia System," *Computer*, 27(3):69-74, Mar. 1994.

Ruemmler, C., et al., "An Introduction to Disk Drive Modeling," *Computer*, 27(3):Mar. 17-28, 1994.

Vin, H., et al., "A Statistical Admission Control Algorithm for Multimedia Servers," *Proceedings of the 2nd ACM International Conference on Multimedia*, pp. 33-40, Oct. 1994.

Wozniakowski, H., "Average Case Complexity of Multivariate Integration," *Bull. Amer. Math. Soc. (New Ser.)*, 24(1):185-194, Jan. 1991.

Zimmermann, R., et al., "Comprehensive Statistical Admission Control for Streaming Media Servers," *Proceedings of the 11th ACM International Conference on Multimedia*, pp. 75-85, Nov. 2003.

Zimmermann, R., et al., "Design of a Large Scale Data Stream Recorder," *Proceedings of the 5th International Conference on Enterprise Information Systems (ICEIS 2003)*, pp. 156-165, Apr. 2003.

* cited by examiner

US 7,584,324 B2

STATISTICAL BASED ADMISSION CONTROL TECHNIQUE USING THREE RANDOM VARIABLE ADMISSION CONTROL

PRIORITY

The present application claims priority from Provisional Application No. 60/601,391, filed Aug. 12, 2004, the contents of which are herewith incorporated by reference.

STATEMENT AS TO FEDERALLY SPONSORED RESEARCH

This application may have received funding under Grant No. EEC-9519152 NSF and No. IIS-0082826 NSF. The government may have certain rights to this invention.

BACKGROUND

Magnetic disk drives may be used for many different video applications. Examples include streaming media servers, digital hub devices such as TiVo, and TV studio and film production equipment.

When used for video, disk drives assign data blocks in one of two generally accepted paradigms: either in a round-robin sequence, or randomly.

The round robin placement uses a cycle based approach. This guarantees certain aspects of service quality. The random placement uses a deadline driven approach. This may have certain advantages such as delivery rate advantages with a single storage data block size, improved support for interactive applications and support for certain kinds of data reorganization. These latter applications may be supported with cycle based scheduling. However, cycle based scheduling may need to assume that certain disk parameters have their worst-case values. This can cause complexity and lack of efficiency.

Deadline driven scheduling can be configured efficiently in a way that encodes a low probability of disruptions. One important task includes limiting the number of streams to minimize the number of missed deadlines. This task is performed by the admission control part of the scheduler.

SUMMARY

The present application describes a statistical based admission control technique referred to as three random variable admission control, or TRAC. One aspect enables defining a maximum probability of missed deadlines.

BRIEF DESCRIPTION OF THE DRAWINGS

These and other aspects will now be described in detail with reference to the accompanying drawings, wherein.

DETAILED DESCRIPTION

The general structure and techniques, and more specific embodiments which can be used to effect different ways of carrying out the more general goals are described herein.

The admission control algorithm which is used herein enables modeling a more comprehensive set of features for real-time storage and retrieval then many previous techniques. One aspect targets multi-stream architectures. Typical personal video recorders such as TiVos are often restricted to one recording and one playback stream. Such a set of streams has typically enjoyed minimal if any problems with disk bandwidth resources, especially if the video is being compressed. Hence, the scenario of one recording stream, one playback stream provides minimal barriers to the admission control procedures.

However, complex video control devices may manage multiple video and audio streams using FireWire, USB and/or a wireless connection. This provides a resource constrained large-scale or multiscale system.

According to aspects, the present system supports many different kinds of video access. It may be important to support variable bit rate streams in order to support certain kinds of compressed video such as MPEG-2 movies. It may also be important to support concurrent reading and writing of video streams.

Figure 1A:
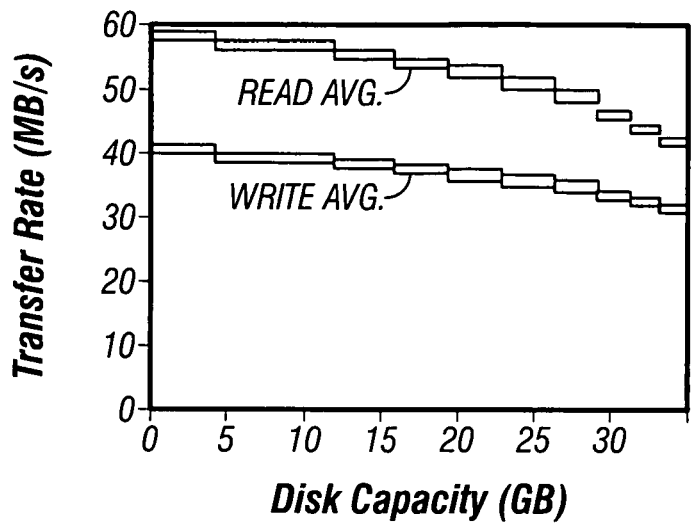
FIG. 1A illustrates a read and write transfer profile of a specified disk drive.
Figure 1B:
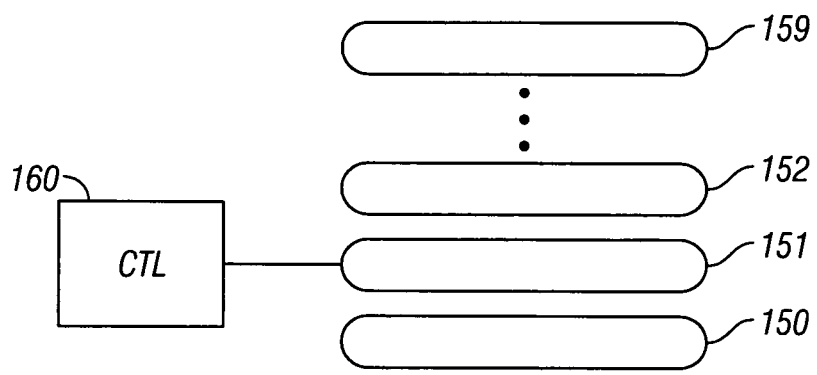
FIG. 1B illustrates the parts of a disk drive, including the multiple platters and processing part.

One feature that is modeled and accounted for according to the present system, is that many disk drives provide less write bandwidth than read bandwidth. For example, FIG. 1A illustrates the read and write transfer profile of an exemplary disk drive, and FIG. 1B shows a block diagram of such a drive. The disk drive includes a plurality of platters 150, 151, 152, 159. A controller 160 controls the operation of the drive, according to the techniques described herein. The top curve of FIG. 1A shows the read profile, and the bottom curve shows the write profile.

According to the present system, the combined available bandwidth becomes a function of the mix of reading and writing. An embodiment describes using a dynamic bandwidth sharing mechanism as part of the admission control, which takes into account expected reading amounts, expected writing amounts, and other parameters.

Another important issue may be support for multizone discs. FIG. 1A illustrates how the transfer rates for disk drives may be different depending on the position of writing on the disk. The data is recorded in concentric "rings" (called zones) on each platter. The outermost ring has the longest circumference and can hence store the most data. Because a platter spins at a constant angular velocity, more data per time unit is transferred from a large ring as opposed to a small ring. The outermost zone of the disk may provide up to 30% more bandwidth then the innermost zone of the disk.

The present system may also support modeling of the variable seek time and the variable rotational latency that is naturally part of every data block that is read and written. Finally, this may support efficient data placement in random locations.

The technique is based on parameters of the disk and the multiple clients of the disk. For a specified scenario, the system may be service variable rate clients using deadline driven scheduling and data blocks that are allocated to a disk using a random placement policy. Server activity is observed periodically. The time interval over which observation is maintained is referred to as $T_{svr}$.

This phase of the model is hence characterized by three random variables:

D(i) denotes the amount of the data to be retrieved or recorded for the client i during the observation window $T_{svr}$.

$\overline{R_{Dr}}$ represents the average disk read bandwidth during the interval $T_{svr}$ with no bandwidth allocation to writing, and $T_{seek}(av)$ denotes the average disk seek time during each observation time interval $T_{svr}$.

$T_{seek}(i)$ defines the disk seek time for client i during the interval $T_{svr}$. $N_{rs}$ is defined as the number of retrieval streams, and $n_{ws}$ is defined as the number of recording streams. Therefore, $n = n_{rs} + n_{ws}$. Also, $R_{Dw}$(hat) represents the average disk bandwidth (here in megabytes per second) allocated for writing during $T_{svr}$. Similarly, $R_{Dr}$(hat) represents the average bandwidth for reading. The mixed load of retrieving and recording clients provides an average combined disk bandwidth of $R_{Dio}$(av) which is constrained by $R_{Dio}$(av)=$R_{Dr}$(hat)+$R_{Dw}$(hat).

Consequently, the maximum data that can be read and written during each interval $T_{svr}$ can be expressed by $$\overline{R_{Dio}} \times (T_{svr} - \Sigma_{i+1}^{nrs+nws} T_{seek}(i)) \quad (1)$$

Furthermore, if $\Sigma_{i=1}^n D(i)$ Represents the total read and write bandwidth requirement during $T_{svr}$ from all streams n, then the probability of missed deadlines, $p_{iodisk}$ can be computed by:

$$Piodisk = P\left[\sum_{i=1}^n D(i) > \left(\overline{R_{dio}} \times \left(T_{svr} - \sum_{i=1}^n T_{seek}(i)\right)\right)\right] \quad (2)$$

The following describes operation during the worst-case scenario. However, a missed deadline, in a reasonable scenario, may be hidden by data buffering.

If $T_{seek}(j)$ denotes the seek time for a disk access j, where j is an index for each disk during $T_{svr}$, then the total seek time is:

$$\sum_{i=1}^n T_{seek}(i) = \sum_{j=1}^m t_{seek}(j) = m \times t_{seek}$$

Where m denotes the number of seeks and $t_{seek}$ is the average seek time, both during $T_{svr}$. Because every seek operation is followed by a data block read or write, m can also be expressed by $$m = \frac{\sum_{i=1}^n D(i)}{B_{disk}}$$

where $B_{disk}$ is the block size.

The appropriate substitutions allow arriving at the final expression for the probability of over-committing the disk bandwidth, which may translate into missed I/O deadlines.

$$Piodisk = P\left[\sum_{i=1}^n D(i) > \left(\frac{\overline{R_{Dio}} \times T_{svr}}{1 + \frac{\overline{t_{seek}} \times \overline{R_{Dio}}}{B_{disk}}}\right)\right] \leq Preq \quad (3)$$

Here, the random variable $R_{Dio}$(av), the average combined disk bandwidth for the reading and writing mix, has interesting properties which will be exploited.

The FIG. 1A illustration of an exemplary disk transfer rate for reading and writing with a modern multizone disk drive shows how that the average I/O bandwidth, that is the combined bandwidth, will change depending on the mix of read versus write allocation. A partition factor δ is defined herein that defines the percentage of disk bandwidth that is allocated for reading versus writing.

According to the present system, disk bandwidth sharing is set while considering how to partition the disk bandwidth for reading and writing, while maximizing resource utilization. This is done according to the following Design Goals for the admission control algorithm:

DG1: Share the total disk bandwidth between read and write request.

DG2: dynamically allocate the available disk bandwidth to read or write request on demand.

DG3: Support multiple bandwidth sharing policies according to defined definitions.

The following provides some exemplary definitions. It should be understood that there are many other definitions and policies that could be used, but the ones described herein may produce certain advantages.

DEFINITION 3.1: The non-reservation-based bandwidth sharing (NRBS) policy is defined as disk reading and writing request are served with no preference, i.e., no bandwidth reservation for either reading or writing exist.

DEFINITION 3.2: The reservation-based bandwidth sharing (RBS) policy is defined as:

a fraction of the disk bandwidth is reserved for disk reading or writing. When disk bandwidth is reserved for writing it is termed Write-Reservation-based Bandwidth Sharing policy (WRBS). When disk bandwidth is reserved for reading, it is termed Read-Reservation-based bandwidth sharing policy (RRBS).

This issue is generically referred to an bandwidth sharing. The disk bandwidth is partitioned according to δ. As δ moves from 0 to 1, more bandwidth is allocated for reading and $R_{Dio}$ varies from $R_{Dw(av)}$ to $R_{Dr(av)}$. Thus, $R_{Dio(av)}$ can be expressed as:

$$\overline{R_{Dio}} = \delta \overline{R_{Dr}} + (1-\delta)\beta \overline{R_{Dw}} \quad (4)$$

Where $R_{Dr(av)}$ and $R_{Dw(av)}$ are the two random variables. The relationship between the average read and the average write bandwidth is modeled with the parameter $\beta = R_{Dw}/R_{Dr}$. β can be obtained experimentally from disk profiling as explained herein. For a multi-zone disk, the ratio between write and read bandwidth may differ from zone to zone.

Let $\beta_k$ denote the ratio between write and read bandwidth for zone k. For example, for a Seagate Cheetah X15 disk, $\beta_0 = 0.668$, $\beta_1 = 0.679$, and $\beta_2 = 0.673$ (see Table 2) For this disk model, $\beta_k$ varies about 13% ($\beta_k \in [0.668, 0.757]$) across all zones. It can be proved that $\beta \in [\beta_{kmin}, \beta_{kmax}] = [0.668, 0.757]$, where $\beta_{kmin}$ and $\beta_{kmax}$ are the minimum and maximum among all $\beta_k$ respectively, and $k \in [1,w]$ and w is the total number of zones. It is generally true that β does not change much. Based on the strong law of large numbers, $$\lim_{n \to \infty} \frac{\overline{R_{DW}}}{\overline{R_{Dr}}} = \frac{\mu R_{DW}}{\mu R_{DW}}$$

The model may be simplified by using the limit value as β in further calculations. Therefore, Eq. 4 Can be rewritten as:

$$\overline{R_{Dio}} = \delta \overline{R_{Dr}} + (1-\delta)\beta R_{Dr} \quad (5)$$

To satisfy DG1 and DG2, the partition factor δ must be dynamically adjusted according to the system conditions, i.e., the ratio between the read and write load. This behavior may be modeled by the mixed-load factor α

$$\alpha = \frac{rD_r}{r_{Dr} + \frac{R_{Dw}}{\beta}} \quad (6)$$

where $r_{Dr}$ and $r_{Dw}$ denote the current disk read and write bandwidth, respectively. For example, with α=1 only reading clients exist in the system, and α=0 implies only recording clients are in the system.

Next, δ is then computed under disk read load $r_{Dr}$ and write load $r_{Dw}$ conditions, using different bandwidth sharing policies, assuming that $r_{Dr}+r_{Dw}>0$. We conjecture the following theorem.

THEOREM 3.3: To satisfy the design goals DG1, DG2, and DG3, $$\delta = \alpha = \frac{R_{Dr}}{r_{Dr} + \frac{R_{Dw}}{\beta}}$$

The bandwidth sharing policies can be adjusted according to application. Disk bandwidth with a mixed load factor α can be expressed as:

$$\overline{R_{Dio}} = \alpha \overline{R_{Dr}} + (1-\alpha)\beta \overline{R_{Dr}} \quad (7)$$

This equation considers two extreme cases as well: (1) when there is only read load, i.e., α=1, $R_{Dio}=R_{Dr}$, and (2) when there is only write load, i.e., α=0, $R_{Dio}=\beta R_{Dr}=R_{Dw}$.

Based on Eq. 7, Eq. 3 can be further generalized to $$-P\left[\sum_{i=1}^{n} D(z) > \left(\frac{(\alpha \overline{R_{Dr}} + (1 \ldots \alpha)\beta \overline{R_{Dr}} T_{svr}}{1 + \frac{\overline{t_{seek}} \times (\alpha R_{Dr}+)1-\alpha)\beta R_{Dr})}{B_{disk}}}\right)\right] \leq Preq \quad (8)$$

Where α can be approximated with Eq. 9, in which $\mu_i$ denotes the mean value of random variable D(i).

$$\alpha \approx \frac{\sum_{i=1}^{n_{rs}} \mu i}{\sum_{i=1}^{n_{rs}} \mu i + \frac{\sum_{i=1}^{n_{ws}} \mu i}{\beta}} \quad (9)$$

Let X, Y and Z denote $\Sigma_{i=1}{}^n D(i)$, $\overline{t_{seek}}$ and $\overline{R_{Dr}}$ respectively.
The probability
In Eq. 8 can then be evaluated as follows $$Piodisk = P[(X, Y, Z) \in R] \quad (10)$$
$$= \int\int\int_R fxyz(x, y, z)dxdydz$$

Where

-continued $$R = \{(X, Y, Z) | X > \left(\frac{(\alpha Z + (1-\alpha)\beta Z) \times Tsvr}{1 + \frac{Y \times (\alpha Z + (1-\alpha)\beta Z)}{B_{disk}}}\right)\} \quad (11)$$

And $f_{xyz}(x,y,z)$ is the joint probability density function ("pdf") of X, Y, Z.

Figure 2:
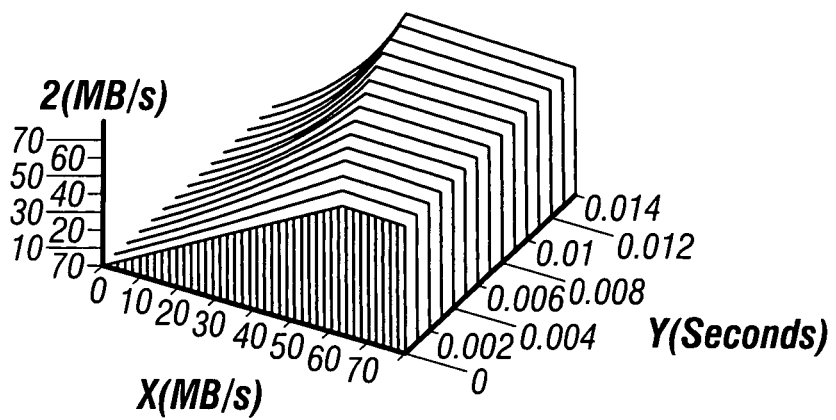
FIG. 2 illustrates an integration region for specified parameters.

FIG. 2 shows the integration region ℛ of Eq. 11 with $T_{svr}=1$ second, $B_{disk}=1$ MB, α=0.5, and β=0.8. FIG. 2 shows only a small portion of the 3D space, where 0<X<80 MB/s, 0<Y<14 ms and 0<Z, 70 MB/s, which covers the operation parameters for most modern disk drives. Since the three random variables $\Sigma_{i=1}{}^n D(i)$, $\overline{t_{seek}}$ and $\overline{R_{Dr}}$ are independent, this can be written as:

$$fxyz(x,y,z)=fx(x)\cdot fy(y)\cdot fz(z) \quad (12)$$

Where fx (x), fy(y) and fz(z) are the probability density functions of X, Y and Z, respectively.

fx (x), fy (y), and fz(z), can be derived as follows:
Determination of fx(x): pdf of $\Sigma_{i=1}{}^n D(i)$ D(i), as described above, denotes the amount of data that client i reads or writes during $T_{svr}$. Since D(i) is only dependent on the stream bandwidth characteristics of each client, D(1)-D(n) are independent random variables. According to the central limit theorem, $\Sigma_{i=1}{}^n D(i)$ approaches a normal distribution with mean $\Sigma^n{}_{i=1}\mu i(\text{fix})$ and variance $\Sigma^n{}_{i=1(fix)}$ where ui and σ² denote the mean value and variance of D(i), respectively. Therefore, the probability density function of $\Sigma_{i=1}{}^n D(i)$ may be expressed as:

$$fx(x) = \frac{1}{\sqrt{2\Pi \sum_{i=1}^{n} \sigma_i^2}} e - \frac{\left[x - \sum_{i=1}^{n}\mu i\right]^2}{2 \times \sum_{i=1}^{n}\sigma_i^2} (\text{fix}) \quad (13)$$

The other fs may be obtained in similar ways.
Fy(y) is a probability density function of $t_{seek}$ Eq. 2 explains that $$\overline{t_{seek}} = \frac{\sum_{j=1}^{rh} \overline{t_{seek}(j)}}{m}$$

which shows that $t_{seek}$ is dependent on m variables $t_{seek}$ (j), with j∈[1,m]. Due to the random data placement, these m random variables are independently and identically distributed with mean value $\mu t_{seek}$ (j) and variance $\sigma^2 t_{seek}$ (j). Assuming m>30, by the central limit theorem $t_{seek}$ also has a normal distribution with mean $\mu^2 t_{seek}$ (j) and variance $\sigma^2 t_{seek}$ (j).
Since $$m = \frac{\sum_{i=1}^{n} D(i)}{B_{disk}}$$

has a normal distribution and $B_{disk}$ is a constant; furthermore m is normally distributed with mean $$\frac{\sum_{i=1}^{n} \mu i}{B_{disk}}$$

and variance $$\frac{\sum_{i=1}^{n} \delta_i^2}{B2_{disk}}.$$

To simplify the model, m can be approximated with its mean value in later derivations. This allows obtaining the probability density function of $t_{seek}$ as:

$$fy(\gamma) \approx \frac{1}{\sqrt{2\pi t_{seek}^2(j)}} e^{-\frac{\sum_{i=1}^{n} \mu_i}{2B_{disk}} \left[\frac{\gamma - \mu_{t_{seek}}(j)}{\mu_{t_{seek}}(j)}\right]^2} \quad (14)$$

Determination of $\mu t_{seek}(j)$ and $\sigma t_{seek}(j)$

Let $U_j$ denote the rotational latency for disk access j and let Sj denote the percentage value (between 0 and 100) of the total disk storage capacity. The rotational latency may be considered to be part of the seek time $t_{seek}(j)$. The relationship among $t_{seek}(j)$, $S_j$, and $U_j$ can be established through disk profiling and modeling as $$t_{seek}(j) = \begin{cases} a_1 + b_1\sqrt{S_j + U_j} & \text{if } 0 \le S_j \le r \\ a_2 + b_2 S_j + U_j & \text{if } r < S_j \le 100 \end{cases} \quad (15)$$

Where $a_1$, $b_1$, $a_2$, $b_2$ and r are the disk seek modeling parameters. Because of the random data placement, both Sj and Uj follow a uniform distribution with pdfs $$f_{sj}(s) = \frac{1}{100} (s \in [0, 100]) \text{ and } f_{uj}(u) = \frac{1}{h} (u \in [0, h]),$$

where h denotes the maximum rotational latency. This allows deriving the pdf of $t_{seek}(j)$ and computing $\mu t_{seek}(j)$ and $t_{seek}(j)$.

Figure 3A:
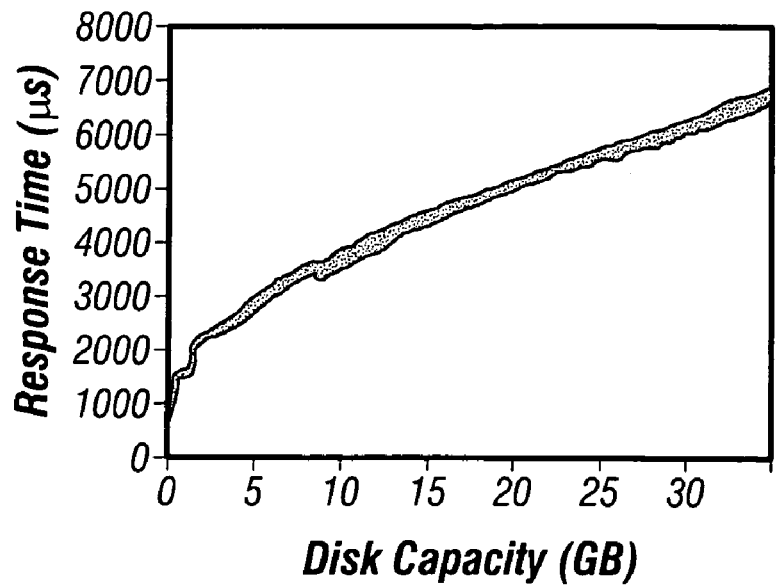
FIGS. 3A and 3B illustrate the seek time profile and probability function respectively for a specific disk drive.
Figure 3B:
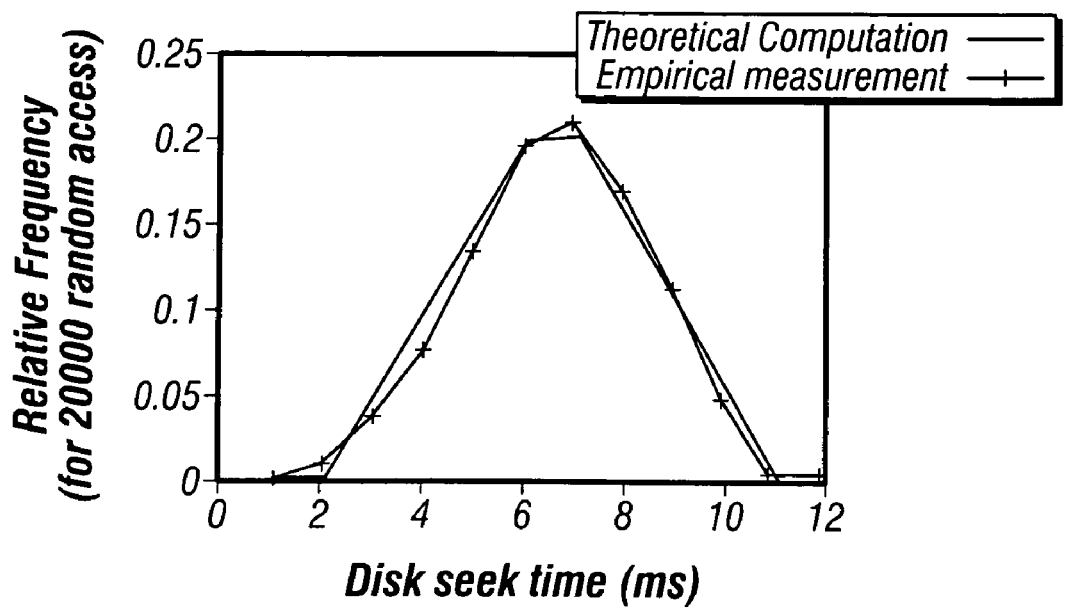

FIG. 3(a) shows the seek time profile of a Seagate cheetah x15 disk which has the following parameters: $a_1=1$, $b_1=0.6$, $a_2=2.1$, $b_2=0.05$, r=5, and h=4 ms. FIG. 3(b) shows a good match of the derived pdf of $t_{seek}(j)$, with the empirically measured relatively frequency histogram. Using the pdf of $t_{seek}(j)$, $\mu t_{seek}(j)$=6.62 ms, $t_{seek}(j)$=1.85 ms is obtained.

fz(z) can also be obtained as a probability density function of $R_{Dr}$.

Let $R_{Dr}(j)$ denote the disk read bandwidth for disk access j during $T_{svr}$. Then the average read bandwidth $R_{Dr}$ can be computed as $$\overline{R_{Dr}} = \frac{\sum_{j=1}^{m} R_{Dr}(j)}{m}$$

where these m random variables are independently and identically distributed with mean value $R_{Dr}(j)$ and variance $\mu R_{Dr}(j)$. Following similar reasoning in as that above, $R_{Dr}$ also approaches a normal distribution with pdf $$fz(z) \approx \frac{1}{\sqrt{2\pi\sigma_{R_{Dr}}^2(j)}} e^{-\frac{\sum_{i=1}^{n} \mu_i}{2B_{disk}} \left[\frac{z - \mu_{R_{Dr}}(j)}{\sigma_{R_{Dr}}(j)}\right]^2} \quad (16)$$

Determination of $\mu R_{Dr}(j)$ and $\sigma R_{Dr}(j)$ is carried out as follows.

Most magnetic disk drives feature variable transfer rates due to a technique called zone-bit recording (ZBR), which increases the amount of data being stored on a track as a function of its distance from the disk spindle. The variable zone transfer rates is modeled with $R_{Dr}(j)$. Let L denote the staring location of each disk access during $t_{svr}$. L can be quantified using the percentage value of the total disk capacity, i.e., L∈[0,100]. From the disk transfer rate profile in FIG. 1, the relationship between $R_{Dr}(j)$ and L is modeled as $$R_{Dr}(j) = \begin{cases} v_1 & \text{if } 0 \le L \le k_1 (L \in \text{Zone 1}) \\ \vdots & \vdots \\ v_w & \text{if } k_{w-1} < L \le k_w (L \in \text{Zone } w) \end{cases} \quad (17)$$

Where w is the number of zones, and $v_i$ and $k_i$ model the multizone characteristics, where $i \in [l,w]$, $v_1 > \ldots > v_w$, $0 < k_1 < \ldots < k_w = 100$, and $[0,k_1]$
$[k_1,k_2], \ldots, [k_{i-1},k_i], \ldots, [k_{w-1},k_w]$ represent zones 1, 2, ... i, ... w respectively. These $w, v_i$ and $k_i$ are termed disk transfer rate modeling parameters. Because of the random data placement, L is uniformly distributed with pdf $$f_L(l) = \frac{1}{100} (1 \in [0,100]).$$

Consequently, with the introduction of Dirac delta functions [18] the pdf $F_{RDr}(r)$ can be derived as:

$$f_{R_{Dr}}(r) = \sum_{i=1}^{w} \frac{k_i - k_i - 1}{100} \delta(r - v_i) \quad (18)$$

The probability density function of $R_{Dr}(j)$ allows determination of $\mu R_{Dr}(j)$ and $\sigma R_{Dr}(j)$. For example, for a Seagate cheetah X15 disk, $\mu R_{Dr}(j)$ =52.26 MB/s and $\sigma R_{Dr}(j)$=5.33 MB/s. The final step is to apply $\mu R_{Dr}(j)$ to Eq. 16 resulting in the pdf for $R_{Dr}$.

The above has described how to determine the necessary components to evaluate piodisk, the probability of over-committing the disk bandwidth.

Figure 4:
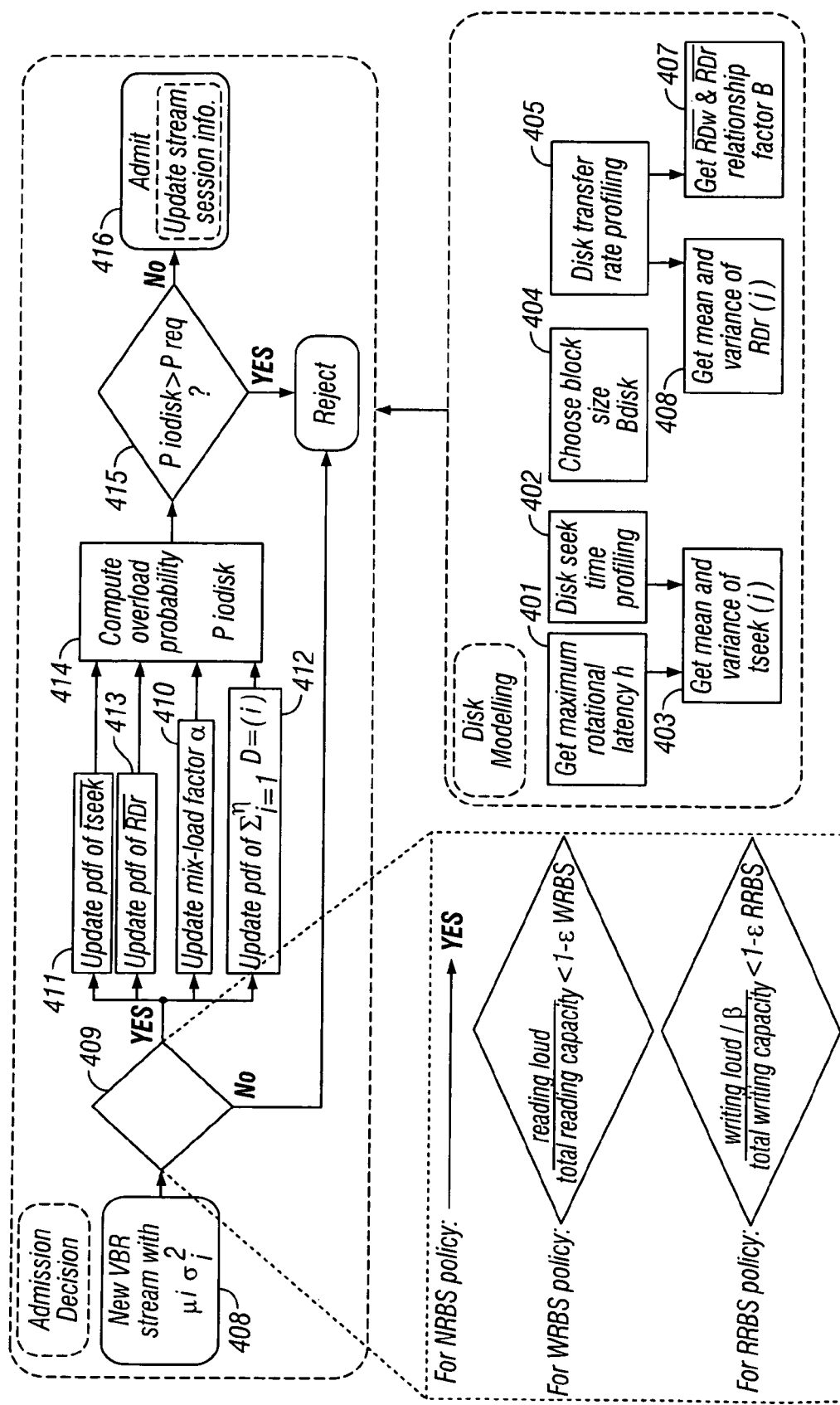
FIG. 4 illustrates a flowchart of the admission control policy.

The above extensively define the probability of missed deadlines. Those probabilities are then incorporated into a complete admission control procedure{s} which supports the bandwidth sharing policies. A flowchart of this is shown in FIG. 4. The flowchart may be executed within the control of 160 that is already present within the disk drive, or alternatively may be executed within any external controller or any device in any way associated with the system. The flowchart is divided into two basic components. The disk model 401-407 finds information about the disk itself which is being used for the application. The present embodiment describes determining this information through analysis, but this may be as simple as reading the information from prestored parameters on the disk. The admission decision module in steps 408-818 carries out the actual admission.

The modeling needs to be evaluated only when a new disk or other device is introduced into the system. 401 and 402 respectively represent determining the maximum rotational latency, and profiling the seek time. The seek profile parameters are used as part of equation 15 above. These values are used to obtain the mean and variance of $T_{seek}(j)$ at 403. 404 selects the optimal block size and 405 profiles the disk transfer rates. The results produce the modeling parameters from equation 17. At 406, the mean and variance of $R_{Dr}(j)$ is obtained as described above. At 407, the relationship between the read and write, and the value data is determined.

As an example, assume the disk transfer rate profile of the Seagate disk of the type shown in FIG. 1A. Table 2 lists the $\beta_k$ value for each of the disc zones.

TABLE 2

Zoning information of a Seagate Cheetah X15 (model ST336752LC) disk.

| Zone | Size | Read | Write | $\beta^a$ | Start | End |
|------|------|------|-------|-----------|-------|-------|
| 0 | 12 | 57.5 | 38.4 | 0.66 | 0 | 12 |
| 1 | 3 | 55.4 | 37.6 | 0.67 | 12 | 15 |
| 2 | 3 | 54.7 | 36.8 | 0.67 | 15 | 18 |
| 3 | 4,000 | 52.7 | 36.2 | 0.68 | 18.94 | 23,040 |
| 4 | 3,000 | 50.6 | 35.3 | 0.69 | 23.04 | 26,112 |
| 5 | 2,500 | 48.1 | 34.5 | 0.71 | 26.11 | 28,672 |
| 6 | 3,000 | 45.6 | 33.1 | 0.72 | 28.67 | 31,744 |
| 7 | 2,500 | 43.6 | 32.2 | 0.73 | 31.74 | 34,304 |
| 8 | 2,500 | 41.9 | 31.7 | 0.75 | 34.30 | 36,864 |

$^a$Ratio between write and read data transfer rate of a zone.

For this specific disk, $\beta_k$ may vary slightly between 0.668 and 0.757. $\beta$ is also bounded by the same range as $\beta_k$. This enables determining $\mu R_{Dw}(j)$, which represents the disk write bandwidth for disk access J during $t_{svr}$ with no bandwidth allocation for reading. The model can be simplified by approximating beta by its limit $$\frac{\mu_{R_{Dw}}}{\mu_{R_{Dw}}}$$

For example, the value for the Cheetah X15 is $\mu\beta=0.690337$.

Note that these disk modeling procedures only need to be evaluated once for each disk drive. This could be done before the system is started in an off-line mode, or online, for example when a new disk is introduced into a streaming server.

The admission decision module is carried out, in contrast, each time there is a new stream request. It starts when a new client request is received at 408. If the request is for recording a stream, then estimates of the mean and variance of the new variable bit rate stream are also provided. If the stream is later admitted, these values will be stored in a repository. Therefore, when the stream request is retrieved, mean and variance are simply retrieved from the internal database.

409 implements the bandwidth sharing policies. In the case of nrbs, this becomes a pass through.

At 410, the mixed-load factor a is updated according to equation 9, and the parameters are calculated at 411, 412 and 413, as described above. 411, calculates or updates the probability density function of the seek time, 412 calculates/updates the probability density function of D, and 413 updates the probability density function of the disk bandwidth characteristics.

At 414, the overload probability $p_{iodisk}$ is computed using equation 10. The decision whether to admit or not is carried out by comparing the probability with the rejection probability at 415. If greater, then the stream request is rejected, otherwise the client request is admitted, at 416, and the session information is added to the internal database.

409 enables policy decisions, and allows providing preferential treatment to either the retrieval or the recording requests. These are referred to as reservation based airing policies, described in definition 3.2. The write rbs denotes a fraction of the disc's read/write capacity that must be reserved for writing. The maximum read load should not exceed that. Hence, at 409, the system read load is added to the new stream, and compared with this limit. The evaluation can be $$\frac{\text{real load}}{\text{total read capacity}} \approx \frac{\sum_{i=1}^{\mu_{rs}} u_i}{\mu_{R_{Dr}}}$$

where $\mu_{RDr}$ is the mean value of the random variable $R_{Dr}(j)$ (see above) and $\mu i(i\epsilon[1,n_{ws}])$ denote the mean value for each variable recording stream.

If the threshold is not exceeded, than the stream may be further evaluated equivalently to the non-reservation policy, else the request is rejected.

Analogously, the read rbs denotes the portion of the discs read/write capacity that is reserved for reading. The fraction of the write load is evaluated and compared with the limit. This evaluation can be similarly or analogously approximated by $$\frac{\text{writing load}/\beta}{\text{total reading capacity}} \approx \frac{\sum_{i=1}^{n_{ws}} \mu_i/\beta}{\mu_{R_{Dr}}}$$

which is the mean value of the random variable $R_{Dr}(j)$ and $\mu i(i\epsilon[1,N_{ws}])$ denote[s] the mean value for each VBR recording stream.

Another embodiment describes multiple disks in the system. For purposes of this embodiment, the number of disks in the system is denoted as $\epsilon$.

The read write resource to support n streams is scaled by a factor of $1/\epsilon$ on average for each individual disk.

$\Sigma_{i=1}^n D(i)$ denotes the total R/W resource requirements during $T_{svr}$. Thus, the average amount of data to be stored to or retrieved from each disk during $T_{svr}$ can be computed as $\lambda$avg $$\lambda avg = \frac{\sum_{i=1}^{n} D(i)}{\varepsilon}$$

Assuming a random data placement across the $\varepsilon$ disks, the R/W resource requirement $\lambda i$ for disk i during $T_{svr}$ can be approximated with $$\lambda i \approx \lambda avg = \frac{\sum_{j=1}^{n} D(j)}{\varepsilon} \quad \text{where } i \in [1, \varepsilon]. \ i \in [1, \varepsilon].$$

Recall that $\Sigma_{i=1}^{n} D(i)$ follows a normal distribution (see above) and since $\varepsilon$ is constant, $\lambda i$ also approaches a normal distribution with mean value $$\mu_{\lambda i} = \frac{\sum_{i=1}^{n} \mu_i}{\varepsilon}.$$

Consequently, following analogous reasoning as in the single disk case, the admission control criteria is modified to:

$$Piodisk = P\left[\frac{\sum_{i=1}^{n} D(i)}{\varepsilon} > \left(\frac{\alpha_{\overline{R_{Dr}}} + (1-a)\beta_{\overline{R_{Dr}}} x T_{svr}}{1 + \frac{T_{seek} x (\alpha_{\overline{R_{Dr}}} + )1 - \alpha\beta_{\overline{R_{Dr}}}}{B_{disk}}}\right)\right] \quad (19)$$

Note that the probability density functions need to be updated to reflect the decreased mean the variance values for the load on each disk. Furthermore the number of seek operations will also be approximately evenly distributed across all disks.

Importantly, it has been found that the benefits of this technique may increase linearly with the number of disks. Computational complexity may depend on the integration region and other disk parameters.

Although only a few embodiments have been disclosed in detail above, other embodiments are possible and the inventors intend these to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, of the rules and design goals can be obtained. Moreover, the disk modeling may be substituted by simple import of characteristics of the disk, for example. While the admission decision is described as being based on probability density functions, it should be understood that any parameter related to probability may be substituted.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
determining information about at least one disk which will be used to store information;
using said information to determine whether to admit a new data stream, said using comprising determining a probability of overcommitting disk bandwidth from all of a first parameter related to disk seek time, a second parameter related to disk bandwidth, and a third parameter related to amount of data exchanged during a disk access, wherein said using further comprises comparing said probability with a rejection probability, and allowing the new data stream to be scheduled based on said comparing, wherein said using further comprises determining a parameter based on the relationship between a disk's average read bandwidth and average write bandwidth, determining a first percentage related to a disk bandwidth reserved for disk reading; and determining a second percentage related to an average amount of data to be retrieved relative to an average amount of data to be recorded based on calculations comprising reading and writing requirements for the data stream.

2. A method as in claim 1, wherein said first, second and third parameters include probability density functions related to said parameters.

3. A method as in claim 2, wherein further comprising at least one of said first, second and third parameters also include a load factor that relates to a probability of disk access being reading versus writing.

4. A method as in claim 2, wherein at least one of said first, second and third parameters also includes a zone factor that relates probabilistically to a distance of writing relative to a spindle of the disk.

5. A method for determining disk bandwidth overcommitment, comprising:
receiving a request to allow a data stream to access one or more disks;
determining a probability that a first parameter, comprising the amount of data to be retrieved and recorded by the one or more disks during a time interval, is greater than the amount of data the one or more disks can retrieve and record during the time interval based on a selection of disk characteristics of the one or more disks that comprises a second parameter based on an average seek time for the one or more disks, and a third parameter based on an average bandwidth for the one or more disks, wherein determining the third parameter further comprises determining a parameter based on the relationship between a disk's average read bandwidth and average write bandwidth;
determining a first percentage related to a disk bandwidth reserved for disk reading;
determining a second percentage related to an average amount of data to be retrieved relative to an average amount of data to be recorded based on calculations comprising reading and writing requirements for the data stream;
comparing the probability against a threshold value; and
accepting or rejecting the data stream based on the comparing.

6. The method of claim 5 wherein determining the third parameter further comprises:
determining a parameter based on the average read bandwidth for the one or more disks; and
determining a parameter based on the average write bandwidth for the one or more disks.

7. The method of claim 5, wherein determining the third parameter further comprises:

determining a parameter based on the average read bandwidth for the one or more disks.

8. The method of claim 5, wherein the selection of disk characteristics further comprises:

a fourth parameter based on the ratio of an average amount of data to be retrieved relative to an average amount of data to be recorded.

9. The method of claim 5, wherein the parameters are determined probabilistically.

10. The method of claim 9, wherein the parameters include probability density functions related to the parameters.

11. The method of claim 5, wherein the first parameter further comprises the number of disks in said set of disks.

12. The method of claim 5, wherein the accepting or rejecting comprises:

accepting the data stream if the probability is less than or equal to the threshold value;

rejecting the data stream if the probability is greater than the threshold value.

13. The method of claim 5 further comprising:

accepting or rejecting the data stream based on comparing the first percentage and the second percentage.

14. The method of claim 5 further comprising:

updating one or more of the parameters based on the reading and writing requirements of the data stream prior to calculating the probability.

15. The method of claim 14, wherein the reading and writing requirements comprise a mean and a variance of a bit rate of the data stream.

16. The method of claim 5 further comprising:

storing the results of the updating if the data stream is accepted.

* * * * *

UNITED STATES PATENT AND TRADEMARK OFFICE
CERTIFICATE OF CORRECTION

PATENT NO. : 7,584,324 B2 Page 1 of 1
APPLICATION NO. : 11/203567
DATED : September 1, 2009
INVENTOR(S) : Roger Zimmermann and Kun Fu It is certified that error appears in the above-identified patent and that said Letters Patent is hereby corrected as shown below:

ON THE TITLE PAGE:

Column 1, item (12), delete "Roger Zimmerman" and insert --Roger Zimmermann--;
Column 1, item (75), delete "Roger Zimmerman" and insert --Roger Zimmermann--;

IN THE SPECIFICATION:

Column 1, lines 14-16, delete "This application may have received funding under Grant No. EEC-9519152 NSF and No. IIS-0082826 NSF. The government may have certain rights to this invention." and insert --This invention was made with government support under Contract Nos. EEC-9519152 and IIS-0082826 awarded by the National Science Foundation. The government has certain rights in the invention--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,584,324 B2  Page 1 of 1
APPLICATION NO. : 11/203567
DATED : September 1, 2009
INVENTOR(S) : Zimmermann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this

Fourteenth Day of September, 2010

David J. Kappos
*Director of the United States Patent and Trademark Office*